US008065698B2

(12) United States Patent  (10) Patent No.: US 8,065,698 B2
Glasgow et al.  (45) Date of Patent: Nov. 22, 2011

(54) METHODS, SYSTEMS, AND COMPUTER PROGRAM PRODUCTS FOR OBTAINING CONSUMER INFORMATION OVER A COMMUNICATIONS NETWORK

(75) Inventors: Jay O. Glasgow, Atlanta, GA (US); Michael Glenn Branam, Lawrenceville, GA (US); Jeffrey David Dodgen, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 951 days.

(21) Appl. No.: 11/370,422

(22) Filed: Mar. 8, 2006

(65) Prior Publication Data

US 2007/0214470 A1  Sep. 13, 2007

(51) Int. Cl.
*H04H 60/33* (2008.01)
(52) U.S. Cl. ......................................................... 725/10
(58) Field of Classification Search ............... 725/10–21, 725/34–61; 705/14.41, 14.49
See application file for complete search history.

(56) References Cited

U.S. PATENT DOCUMENTS

| | | | |
|---|---|---|---|
| 5,600,710 A | | 2/1997 | Weisser, Jr. et al. |
| 5,652,615 A * | | 7/1997 | Bryant et al. .................... 725/35 |
| 5,818,438 A | | 10/1998 | Howe et al. |
| 5,838,774 A | | 11/1998 | Weisser, Jr. |
| 5,892,508 A | | 4/1999 | Howe et al. |
| 6,108,637 A * | | 8/2000 | Blumenau .......................... 705/7 |
| 6,160,989 A * | | 12/2000 | Hendricks et al. ............... 725/36 |
| 6,415,281 B1 | | 7/2002 | Anderson |
| 6,493,327 B1 | | 12/2002 | Fingerhut |
| 6,502,242 B1 | | 12/2002 | Howe et al. |
| 6,567,982 B1 | | 5/2003 | Howe et al. |
| 6,609,253 B1 | | 8/2003 | Swix et al. |
| 6,675,017 B1 | | 1/2004 | Zellner et al. |
| 6,690,292 B1 | | 2/2004 | Meadows et al. |
| 6,718,551 B1 | | 4/2004 | Swix et al. |
| 6,763,334 B1 * | | 7/2004 | Matsumoto et al. ............ 705/14 |
| 6,788,774 B1 | | 9/2004 | Caldwell et al. |
| 6,788,933 B2 | | 9/2004 | Boehmke et al. |
| 6,792,269 B2 | | 9/2004 | Boehmke |
| 6,807,265 B2 | | 10/2004 | Boehmke |
| 6,868,225 B1 * | | 3/2005 | Brown et al. .................... 386/83 |
| 6,975,705 B2 | | 12/2005 | Boehmke et al. |
| 6,978,470 B2 | | 12/2005 | Swix et al. |
| 6,983,478 B1 | | 1/2006 | Grauch et al. |
| 6,993,326 B2 | | 1/2006 | Link, II et al. |
| 7,251,820 B1 * | | 7/2007 | Jost et al. ....................... 725/107 |
| 7,509,663 B2 * | | 3/2009 | Maynard et al. ................. 725/10 |
| 2001/0049620 A1 | | 12/2001 | Blasko |

(Continued)

FOREIGN PATENT DOCUMENTS

WO  WO 0191474 A2 * 11/2001

*Primary Examiner* — Andrew Koenig
*Assistant Examiner* — Alfonso Castro
(74) *Attorney, Agent, or Firm* — Scott P. Zimmerman PLLC

(57) ABSTRACT

Default media services are provided to a multi-user multimedia device over a communications network responsive to identification of the multi-user multimedia device. Additional media services are provided to the multi-user multimedia device over the communications network responsive to obtaining confirmation that a particular one of a group of users of the multi-user multimedia device is currently using the multi-user multimedia device. Demographic information for the particular one of the group of users and device information for the multi-user multimedia device may be provided to an advertiser over the network in real-time, for example, so that advertising may be targeted accordingly. Related methods, systems, and devices are also discussed.

29 Claims, 8 Drawing Sheets

U.S. PATENT DOCUMENTS

| | | | |
|---|---|---|---|
| 2002/0119771 A1 | 8/2002 | Boehmke et al. | |
| 2002/0120638 A1 | 8/2002 | Boehmke | |
| 2002/0120765 A1 | 8/2002 | Boehmke | |
| 2002/0123339 A1 | 9/2002 | Boehmke | |
| 2002/0129368 A1* | 9/2002 | Schlack et al. | 725/46 |
| 2003/0005438 A1* | 1/2003 | Crinon et al. | 725/34 |
| 2003/0093327 A1 | 5/2003 | Roberts et al. | |
| 2003/0101451 A1* | 5/2003 | Bentolila et al. | 725/34 |
| 2003/0105693 A1* | 6/2003 | Conkwright et al. | 705/35 |
| 2003/0121037 A1* | 6/2003 | Swix et al. | 725/34 |
| 2004/0148625 A1* | 7/2004 | Eldering et al. | 725/34 |
| 2004/0163103 A1* | 8/2004 | Swix et al. | 725/13 |
| 2004/0168121 A1 | 8/2004 | Matz | |
| 2004/0226043 A1* | 11/2004 | Mettu et al. | 725/46 |
| 2004/0255321 A1* | 12/2004 | Matz | 725/14 |
| 2004/0261096 A1 | 12/2004 | Matz | |
| 2005/0033849 A1 | 2/2005 | Matz | |
| 2005/0055337 A1 | 3/2005 | Bebo et al. | |
| 2005/0076363 A1* | 4/2005 | Dukes et al. | 725/46 |
| 2005/0120369 A1 | 6/2005 | Matz | |
| 2005/0138668 A1 | 6/2005 | Gray et al. | |
| 2005/0286691 A1 | 12/2005 | Taylor et al. | |
| 2006/0010466 A1 | 1/2006 | Swix et al. | |
| 2007/0143787 A1* | 6/2007 | Cankaya | 725/34 |
| 2007/0204301 A1* | 8/2007 | Benson | 725/46 |
| 2008/0016231 A1* | 1/2008 | Itabashi et al. | 709/229 |
| 2008/0235351 A1* | 9/2008 | Banga et al. | 709/218 |

* cited by examiner

METHODS, SYSTEMS, AND COMPUTER PROGRAM PRODUCTS FOR OBTAINING CONSUMER INFORMATION OVER A COMMUNICATIONS NETWORK

FIELD OF THE INVENTION

The present invention relates to communications networks, and, more particularly, to providing multimedia services over communications networks.

BACKGROUND OF THE INVENTION

In advertising and marketing, it may be desirable to target advertisements to the appropriate potential customer base, rather than to broadcast advertisements in general. For example, it may be ineffective for advertisements for computers to appear in gardening magazines, and advertisements for gardening tools may not be effective in computer magazines.

Targeted advertising has also made its presence in broadcast television environments. For example, attempts have been made to match the television advertisements to users. One known system uses geographic information to attempt to segment consumer lifestyles into identifiable characteristics. In such a lifestyle segmentation system, a database may correlate geography (e.g., zip code) versus predetermined empirical demographic profiles (e.g., household income, age, etc.).

Implementation of interactive television services, such as digital cable and satellite television services which may feature on-demand content, has permitted advertisers to explore new methods for providing targeted advertisements to consumers. For example, consumer viewing habits and choices may be monitored to establish viewing preferences and purchasing habits. More particularly, click-stream data (based on channel selection entries via a remote control) may be used to monitor tune-in behavior, how much time was spent viewing a particular advertisement, and/or what action was taken after the advertisement was viewed. Such information may be used to tailor advertising of particular products and/or services to individual consumers. However, although conventional advertising systems may be able to monitor consumer viewing habits associated with a particular account and/or location, they may not be able to determine to whom (of the one or more individuals associated with the account) the monitored viewing habits belong. In other words, although present targeted advertising systems may be able to determine that a particular program is being watched by someone associated with a particular account, they may be unable to determine any other demographic information about the current viewer. As such, the targeted advertising may not be as effective.

SUMMARY OF THE INVENTION

According to some embodiments of the present invention, a method for obtaining consumer information is provided. In particular, additional media services are provided to a multi-user multimedia device over a communications network responsive to obtaining confirmation that a particular one of a group of users of the multi-user multimedia device is currently using the multi-user multimedia device.

In some embodiments, the method may further include providing default multimedia services to the multi-user multimedia device over the communications network. The default multimedia services may be provided responsive to identification of the multi-user multimedia device, and independent of the particular one of the group of users currently using the multi-user multimedia device. For example, the default multimedia services may be provided based upon authorization information associated with the multi-user multimedia device.

In other embodiments, confirmation that the particular one of the group of users is currently using the multi-user multimedia device may be obtained by requesting identification information for the particular one of the group of users currently using the multi-user multimedia device. User identification information may be received responsive to the requesting, and the particular one of the group of users may be identified based on the received user identification information.

In some embodiments, the identification information may be requested responsive to receiving a request for the additional media services from the multi-user multimedia device. The additional media services may be user-specific media services, based on the identification of the particular one of the group of users.

In other embodiments, demographic information may be determined for the particular one of the group of users that is currently using the multi-user multimedia device based on the confirmation. Advertising content may be served to the multi-user device over the communications network based on the demographic information for the particular one of the group of users. In addition, after serving the advertising content, communications from devices associated with the particular one of the group of users may be monitored to determine an effectiveness of the advertising content.

In some embodiments, the demographic information for the particular one of the group of users and device information for the multi-user multimedia device may be provided to an advertiser. As such, advertising content may be served to the multi-user device over the communications network based on both the demographic information and the device information for the multi-user multimedia device.

In other embodiments, additional media services may be repeatedly provided for a plurality of multi-user multimedia devices, based on obtaining confirmation therefrom. In addition, demographic information may be repeatedly provided for a plurality of current users of the plurality of multi-user multimedia devices to obtain cumulative demographic information for the plurality of current users.

In some embodiments, advertising content may be broadcast to the plurality of multi-user multimedia devices over the communications network based on the cumulative demographic information for the plurality of current users. More specifically, the advertising content may be broadcast based on the cumulative demographic information for the plurality of current users and based on device information for the plurality of multi-user devices corresponding to the plurality of current users.

In other embodiments, the advertising content and desired network conditions for airing the advertising content may be received from an advertiser. For example, the desired network conditions may specify a particular demographic type, a predetermined number of current users, and/or a particular household location for a multi-user multimedia device. The desired network conditions may be determined to be satisfied based on the cumulative demographic information and/or the device information for the plurality of multi-user devices. As such, the advertising content may be broadcast when the desired network conditions are satisfied.

In some embodiments, after broadcasting the advertising content, communications over the network from devices associated with a respective current user and/or multi-user multimedia device may be monitored to determine an effectiveness of the advertising content. More particularly, communications over the network may be monitored from the devices respectively associated with the plurality of current users and/or the plurality of multi-user multimedia devices to network devices associated with a provider of the advertising content. In addition, the communications may be monitored for a predetermined time period after broadcasting the advertising content to determine communications that were made responsive to broadcasting the advertising content. As such, a total number of communications made responsive to broadcasting the advertising content may be indicated to a provider of the advertising content.

In other embodiments, a counter associated with a respective multi-user multimedia device and/or current user thereof may be provided. The counter may be incremented responsive to monitoring communications from devices associated with a respective current user and/or multi-user multimedia device to network devices associated with a provider of the advertising content to determine purchasing tendencies for the current user and/or the multi-user multimedia device. The purchasing tendencies may be provided to the provider of the advertising content.

According to further embodiments of the present invention, a system for obtaining consumer information is provided. The system includes a multimedia application server configured to provide additional media services to a multi-user multimedia device over a communications network responsive to obtaining confirmation that a particular one of a group of users of the multi-user multimedia device is currently using the multi-user multimedia device. The multimedia application server may be embodied according to any of the embodiments described herein.

According to other embodiments of the present invention, a method for obtaining consumer information at a multi-user multimedia device is provided. More particularly, confirmation that a particular one of a group of users of the multi-user multimedia device is currently using the multi-user multimedia device is obtained and provided to a media service provider over a communications network. Additional media services are received from the media service provider over the communications network responsive to the confirmation.

In some embodiments, default media services may be received from the media service provider over the communications network responsive to providing device identification. The default media services may be received independent of the particular one of the group of users currently using the multi-user multimedia device.

In other embodiments, confirmation that the particular one of the group of users is currently using the multi-user multimedia device may be obtained by displaying a prompt for identification information for the particular one of the group of users currently using the multi-user multimedia device via a user interface. The user identification information may be received via the user interface responsive to displaying the prompt. The prompt for the identification information may be displayed responsive to receiving a request for the additional media services via the user interface.

In some embodiments, demographic information may be provided for the particular one of the group of users that is currently using the multi-user multimedia device to the media service provider over the communications network. Based on the demographic information, advertising content may be received over the communications network for the particular one of the group of users. The received advertising content may be displayed at the multi-user multimedia device.

According to still other embodiments of the present invention, a multi-user multimedia device includes a device controller configured to obtain confirmation that a particular one of a group of users of the multi-user multimedia device is currently using the multi-user multimedia device. The device controller is configured to provide the confirmation to a media service provider over a communications network, and receive additional media services from the media service provider over the communications network responsive to the confirmation. The device controller may be embodied according to any of the embodiments described herein.

According to further embodiments of the present invention, a method for serving media content over a communications network to a plurality of multi-user multimedia devices that are shared by a group of users is provided. In particular, default multimedia content is served to a respective multi-user multimedia device in response to identification of the respective multi-user multimedia device. The default multimedia content is served independent of identification of a user who is currently using the respective multi-user multimedia device. In addition, user-specific content is served to a respective multi-user multimedia device in response to identification of a user from the group of users who is currently using the respective multi-user multimedia device.

In some embodiments, the default multimedia content may be different multimedia content based on a respective multi-user multimedia device.

In other embodiments, serving user-specific content may include serving user-specific, multimedia device-specific content to a respective multi-user multimedia device in response to identification of the multimedia device and in response to identification of the user from the group of users who is currently using the multi-user multimedia device.

In some embodiments, the user-specific content may be additional multimedia content and/or services. In other embodiments, the user-specific content may be advertising content.

In some embodiments, prior to serving user-specific content, identification information may be requested for the user who is currently using the multi-user multimedia device. User identification information may be received responsive to the requesting, and the user who is currently using the multi-user multimedia device may be identified based on the received user identification information. The identification information may be requested responsive to receiving a request for the user-specific content from the respective multi-user multimedia device.

In other embodiments, demographic information may be determined for the user who is currently using the respective multi-user multimedia device in response to identification of the user. In addition, serving user-specific content and determining demographic information may be repeatedly performed for a plurality of users who are currently-using the plurality of multi-user multimedia devices to obtain cumulative demographic information for the plurality of users.

In some embodiments, advertising content may be served to the plurality of multi-user multimedia devices over the communications network based on the cumulative demographic information. More particularly, the advertising content and desired network conditions for airing the advertising content may be received from an advertiser. The desired network conditions may specify a particular demographic type, a predetermined number of users who are currently using the plurality of multi-user multimedia devices, and/or a particular household location for a corresponding multi-user multimedia device. The desired network conditions may be determined to be satisfied based on the cumulative demographic information and/or respective identifications of the plurality of multi-user multimedia devices, and the advertising content may be served when the desired network conditions are satisfied.

In other embodiments, after serving the advertising content, communications over the network from devices associated with a respective user and/or multi-user multimedia device may be monitored to determine an effectiveness of the advertising content. For example, communications over the network from the devices respectively associated with the plurality of current users and/or the plurality of multi-user multimedia devices to network devices associated with a provider of the advertising content may be monitored. The communications may be monitored for a predetermined time period after broadcasting the advertising content to determine communications made responsive to broadcasting the advertising content.

According to still further embodiments of the present invention, a system for serving media content over a communications network to a plurality of multi-user multimedia devices that are shared by a group of users is provided. The system includes a multimedia content server configured to serve default multimedia content to a respective multi-user multimedia device in response to identification of the respective multi-user multimedia device. The default multimedia content is served independent of identification of a user who is currently using the respective multi-user multimedia device. In addition, the multimedia content server is configured to serve user-specific content to a respective multi-user multimedia device in response to identification of a user from the group of users who is currently using the respective multi-user multimedia device. The multimedia content server may be embodied according to any of the embodiments described herein.

Other methods, systems, devices, and/or computer program products according to other embodiments of the invention will become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
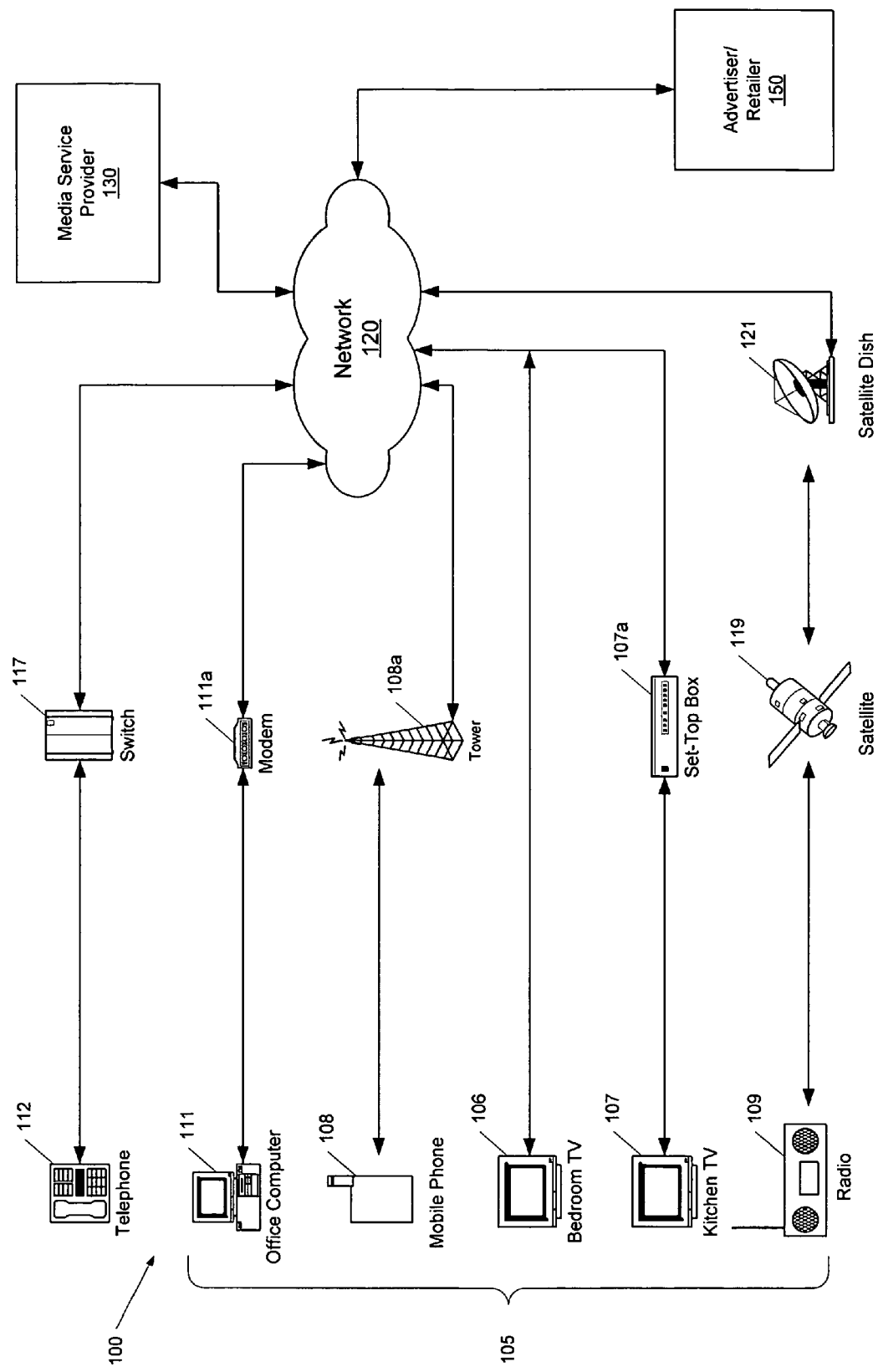
FIG. 1 is a block diagram that illustrates a system for obtaining consumer information according to some embodiments of the present invention.

Specific exemplary embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The present invention is described hereinafter with reference to flowchart and/or block diagram illustrations of systems, methods, and computer program products in accordance with some embodiments of the invention. These flowchart and/or block diagrams further illustrate exemplary operations of the system and device architectures of FIGS. 1 to 8. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

As used herein, the term "multimedia device" may include any device that is capable of receiving and displaying audio and/or video content, and may include a television; a set-top box for a television; a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a personal computer (mobile or stationary) that includes a modem or other network transceiver. In addition, "media services" or "multimedia content" may include audio and/or video content, applications and/or services. In addition, as used herein, the term "packet" means a unit of information and/or a block of data that may be transmitted electronically as a whole or via segments from one device to another. Accordingly, as used herein, the term "packet" may encompass such terms of art as "frame" and/or "message," which may also be used to refer to a unit of transmission.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

Some embodiments of the present invention may arise from a realization that offering additional and/or personalized media services to a current user of a multimedia network device that is used and/or shared by a group of users may encourage the current user to "login" to the device, for example, using a personal password or PIN. Once the current user has logged in, a media service provider can confirm exactly which one of the group of users of the multimedia device is currently using the device, and can offer this information to other interested parties, such as advertisers and/or retailers, as may be permitted by privacy laws. More particularly, data identifying characteristics of the end user, such as demographic information, may be provided to an advertiser, without revealing the actual identity of the particular one of the group of users. As such, the name of the particular user may not be provided to the advertiser, in accordance with privacy laws. Accordingly, the advertiser may be able to determine demographic information for a current user of a multimedia network device in real-time, and may be able to target advertising content accordingly.

FIG. 1 is a block diagram illustrating systems and methods for obtaining consumer information over a communications network according to some embodiments of the present invention. Referring now to FIG. 1, a communication system 100 includes one or more multi-user multimedia devices 105 that are configured to receive media services from a media service provider 130 over one or more communications networks, such as network 120. The media service provider 130 may provide telephone, cellular phone, internet, and/or television services to one or more of the multi-user multimedia devices 105.

As shown in FIG. 1, the multi-user multimedia devices 105 may include one or more televisions 106 and 107, a cell phone 108, a radio 109, and/or a personal computer 111. The televisions 106 and 107 may be analog televisions and/or digital televisions configured to receive standard and/or high-definition (HD) content. For example, television 107 may be an analog television located in a kitchen of a household, and may receive broadcast programming over the network 120 via a set-top box 107a. In contrast, television 106 may be a digital television, such as an Internet Protocol Television (IPTV) located in a bedroom of the household, and may be configured to receive broadcast programming over the network 120 via an integrated digital tuner. The radio 109 may be a conventional terrestrial and/or satellite radio. For example, the radio 109 may receive programming broadcast over the network 120 via a satellite 119 and a satellite dish 121 coupled to the network 120. Similarly, the cell phone 108 may be an analog and/or digital cell phone, and may receive multimedia content over the network 120 via a base station 108a. The personal computer 111 may be located in an office of the household, and may be connected to the network 120 via modem 111a. In addition, the system 100 may include other communications devices associated with the multi-user multimedia devices 105 and/or with users thereof, such as a telephone 112, which may be connected to the network 120 via a switch 117.

The media service provider 130 may be configured to provide (or "serve") media content to the multi-user multimedia devices 105 over the network 120. As used herein, "serving" may be used to describe the transmission of multimedia content or other data from a service provider to one or more devices over a communications network. As such, different content may be transmitted to each of the devices, for example, based on identification of the device and/or a current user thereof. In contrast, as used herein, "broadcasting" may be used to describe the transmission of the same content from the service provider to multiple devices over the communications network. As also used herein, "identification" of a particular user may include identification of the user's actual name, or merely of data identifying characteristics of a respective end user (such as demographic information) based on the user's ID name, PIN, and/or password, in compliance with applicable privacy laws.

Still referring to FIG. 1, the media service provider 130 may be configured to serve default multimedia content to one or more of the multi-user multimedia devices 105 in response to identifying and/or authenticating the multi-user multimedia devices 105. For instance, the media service provider 130 may provide a regular bandwidth version of particular multimedia content to the televisions 106 and/or 107, but may provide a reduced bandwidth version of the multimedia content to the cell phone 108 based on the particular connection thereto. In addition, the media service provider 130 may be configured to provide different multimedia content to particular ones of the multi-user multimedia devices 105, for example, based on authorization information associated with each of the multi-user multimedia devices 105. For example, the media service provider 130 may be configured to provide family-friendly content to the kitchen television 107, but may be configured to provide adult content to the bedroom television 106 based on the authorization information provided by each of the devices 106 and 107 during identification. Identification and/or authentication of the multi-user multimedia devices 105 may be performed by conventional methods as are well-known in the art, and will not be discussed further herein.

The media service provider 130 may also be configured to serve user-specific content to one or more of the multi-user multimedia devices 105 in response to identification of a current user of a particular device. More particularly, the media service provider 130 may be configured to provide additional media services to one or more of the multi-user multimedia devices 105 over the network 120 responsive to obtaining confirmation that a particular one of a group of users associated with one or more of the multi-user multimedia devices 105 is currently using a respective multi-user multimedia device. The additional and/or user-specific media services may include additional content, electronic programming guides (EPGs), personal account information, and/or other user-specific multimedia content. The particular one of the group of users associated with a multi-user multimedia device may be identified by requesting identification information from the current user via a user interface of the multi-user multimedia device and receiving user identification information (such as a PIN or password) therefrom. Based on the received user identification information, an identity of the current user can be determined by the media service provider 130, for example, by consulting a database containing customer information associated with the multi-user multimedia devices 105. Demographic information, such as age, sex, race, address, marital status, interests, hobbies, income level, purchasing habits, location, and/or broadcast viewing habits, may also be determined for the particular one of the group of users that is currently using a particular one of the multi-user multimedia devices, based on the confirmation.

Accordingly, demographic information for a current user, as well as device identification information for the particular one of the multi-user multimedia devices 105 currently in use, may be provided to an advertiser/retailer 150 in real-time over the network 120. However, personal information, such as the name of the particular one of the group of users that is currently using a multi-user multimedia device, may not be provided to the advertiser 150, in accordance with privacy laws. As such, the advertiser 150 may be able to determine demographic information for a current user the services provided by the multimedia service provider 130, and may be able to target advertising content accordingly. Similarly, the media service provider 130 may obtain confirmation for a plurality of current users of the multi-user multimedia devices 105, and may thereby determine cumulative demographic information for the plurality of current users, as well as cumulative device information for the multi-user multimedia devices 105 currently in-use.

The cumulative information may be provided to the advertiser 150. Based on this cumulative information, the advertiser 150 may wish to provide particular advertising content to the plurality of multi-user multimedia devices 105 over the network 120. More particularly, the media service provider 130 may receive advertising content and desired network conditions for airing the advertising content from the advertiser 150. The desired network conditions may specify, for instance, a particular demographic type and/or a predetermined number of current users as conditions for broadcast of the advertising content. For example, the advertiser 150 may be a pizza restaurant owner, and may wish to air a pizza commercial when 7000 males ages 40-45 are currently watching TV. The media service provider 130 may then broadcast the pizza commercial supplied by the advertiser 150 when the desired network conditions are satisfied, based on the cumulative demographic and/or device information. The advertiser 150 may also specify particular times of day and/or particular household locations for the multi-user multimedia devices as part of the desired network conditions. For example, the advertiser 150 may be a manufacturer of a sleep-inducing drug, and may wish to air a commercial for the product between the hours of 12 a.m. and 5 a.m. to users of multi-user multimedia devices located in a bedroom, as such users may likely suffer from insomnia. In addition, combinations of demographic user information and/or device information may be specified as desired network conditions. As such, user-specific, device-specific content may be provided.

After broadcasting the advertising content, the service provider 130 may monitor communications over the network 120 from devices associated with the identified current users and/or multimedia devices, to determine an effectiveness of the advertising content. For example, the media service provider 130 may monitor outgoing calls to one or more telephone numbers associated with the advertiser 150 for a predetermined time period after broadcasting the advertising content. As such, communications made responsive to broadcasting the advertising content may be determined, and the media service provider 130 may provide a total number of communications made responsive to broadcasting the advertising content to the advertiser 150. As such, the advertiser 150 may receive a solid call generation number that is attributed to a particular commercial.

Additional description of some embodiments of the present invention will be provided with reference to the following example. In the example, all of the devices 105 and 112 of FIG. 1 are located in a single household. Referring again to FIG. 1, Nancy, a single mother with three children, is watching her television 107 in her kitchen at 6:30 p.m. Nancy wishes to view her list of favorite programs (which she had previously stored using the set-top box 107a), and as such, enters her PIN using her remote control. The set-top box 107a transmits Nancy's PIN via the network 120 to the media service provider 130, which determines that Nancy is the current user (of the four possible users) of the kitchen TV 107 by accessing account information associated with the set-top box 107a. Accordingly, the media service provider 130 provides Nancy's favorites list to the set top box 107a, which the set-top box 107a provides to Nancy via the TV 107. In addition, upon obtaining confirmation that Nancy is currently using the kitchen TV 107, the media service provider 130 determines that Nancy is one of 276 other single mothers currently watching Everybody Loves Raymond on channel 13 at 6:30. The media service provider 130 also determines that these are the exact network conditions specified by an advertiser 150 who owns and operates a pizza delivery business. As such, during the next commercial break, the media service provider 130 broadcasts a pizza delivery commercial provided by the advertiser 150 over the network 120 on channel 13.

The media service provider 130 then monitors communications from devices associated with each of the 276 identified single mothers for outgoing calls to any of the 12 pizza restaurant locations of the advertiser 150. For example, the media service provider 130 may monitor communications from Nancy's other multi-user multimedia devices 105, such as her cell phone 108 and/or her personal computer 111. In addition, the media service provider 130 may monitor communications from other devices it knows to be associated with Nancy, such as her telephone 112 (via a switch 117). The media service provider 130 monitors communications for 30 minutes (as specified by the advertiser 150), and determines that, out of the 276 confirmed current viewers, 111 calls were placed to the 12 business locations of the advertiser 150. The media service provider 130 then provides to the advertiser 150 a report, stating that the commercial aired at 6:35 p.m., was viewed by at least 276 viewers, and generated at least 111 phone calls to the advertiser's 12 locations. As such, the advertiser 150 is able to confirm the effectiveness of his commercial.

Although FIG. 1 illustrates an exemplary communications network configured to obtain consumer information, it will be understood that the present invention is not limited to such configurations, but is intended to encompass any configuration capable of carrying out the operations described herein.

Figure 2:
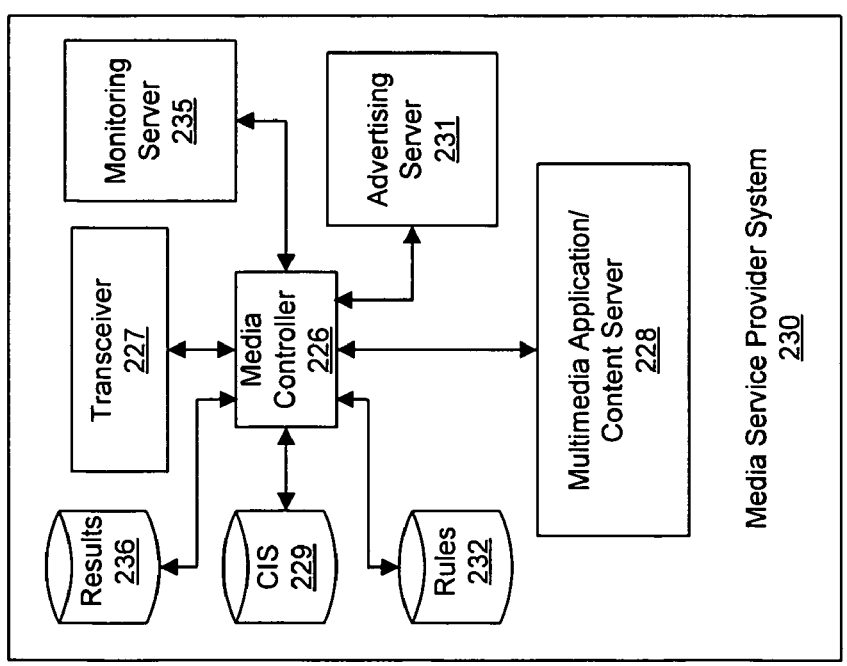
FIG. 2 is a block diagram of a media service provider system according to some embodiments of the present invention.

FIG. 2 is a block diagram illustrating a media service provider system 230 configured to obtain consumer information over a communications network according to some embodiments of the present invention. The media service provider system 230 may correspond to the media service provider 130 of FIG. 1. As shown in FIG. 2, the media service provider system 230 includes a media controller 226, a transceiver 227, a multimedia application/content server 228, an advertising server 231, and a monitoring server 235. The system 230 further includes one or more databases, such as a customer information storage (CIS) database 229, an advertising rules database 232, and an advertising results database 236, which may be accessed by the media controller 226. The transceiver 227 typically includes a transmitter circuit and a receiver circuit, which cooperate to respectively transmit multimedia content and/or services to one or more multi-user multimedia devices and receive consumer information therefrom over a communications network. As used herein, multimedia content and/or services may refer to audio and/or video content, applications, and/or services. The media controller 226 may be, for example, a commercially available or custom microprocessor that is configured to coordinate and manage operations of the transceiver 227, the multimedia application/content server 228, the advertising server 231, and/or the monitoring server 235.

More particularly, the multimedia application/content server 228 is configured to provide default media services to one or more multi-user multimedia devices, such as the multi-user multimedia devices 105 of FIG. 1, over a communications network responsive to identification of the one or more multi-user multimedia devices. The multimedia application/content server 228 may be configured to provide the default media services independent of a particular user currently using the one or more multi-user multimedia devices. In addition, the multimedia application/content server 228 is configured to provide additional media services to a multi-user multimedia device responsive to obtaining confirmation that a particular one of a group of users of the multi-user multimedia devices is currently using the multi-user multimedia device. The media service provider system 230 may obtain confirmation that the particular one of the group of users is currently using the particular multi-user multimedia device by transmitting a request for user identification information to the particular multi-user multimedia device and receiving the user identification information therefrom in response to the request via the transceiver 227.

Based on the received user identification information, the media controller 226 may identify the particular one of the group of users by consulting the CIS database 229. The CIS database 229 may include account information for the group of users associated with the particular multi-user multimedia device, including SSO (single sign-on) identities for each of the group of users. The media service provider system 230 may transmit the request for identification information responsive to receiving a request for additional media services from the multi-user multimedia device. Based on the identification, demographic information for a particular one of the group of users may be determined and provided to the advertising server 231. In addition, the media controller 226 may determine demographic information for a plurality of current users of multi-user multimedia devices, and as such, may provide the advertising server 231 with cumulative demographic information for the plurality of current users.

The advertising server 231 may be configured to receive and store advertising content that may be provided by an advertiser, such as the advertiser/retailer 150 of FIG. 1. The advertising server 231 may also be configured to receive desired network conditions for airing the advertising content, which may be stored in the advertising rules database 232. For example, the rules stored in the advertising rules database 232 may specify a particular demographic type, a predetermined number of current users, a predetermined time of day, and/or a particular household location for a multi-user multimedia device, which may be conditions precedent to broadcasting the advertising content over the communications network. In addition, the advertising rules database 232 may specify particular conditions for serving advertising content to a particular multi-user multimedia device, rather than to the plurality of devices.

The advertising server 231 may also be configured to receive cumulative device information for the plurality of multi-user multimedia devices that are currently in-use. Based on the cumulative demographic information and/or the device information for the plurality of multi-user multimedia devices, the advertising server 231 may determine that the desired network conditions are satisfied, for example, by consulting the advertising rules database 232. The advertising server 231 is configured to broadcast the advertising content to the multi-user multimedia devices currently in-use over the communications network via the transceiver 227 if the desired network conditions are satisfied. As such, an advertiser may specify that the advertising content be broadcast based on particular demographic characteristics of the plurality of current users and/or particular device characteristics of the plurality of multi-user multimedia devices currently in use. In other words, the broadcast may be made based on user-specific, device-specific, and/or user-specific and device-specific conditions.

After the advertising content has been broadcast, the monitoring server 235 is configured to monitor communications over the communications network from devices associated with one or more of the plurality of current users and/or plurality of multi-user multimedia devices in order to determine an effectiveness of the advertising content. For example, the monitoring server 235 may be configured to monitor the network for outgoing communications to network devices associated with the advertiser who provided the advertising content for a predetermined time period after the advertising content was broadcast. More particularly, a list of outgoing calls from the communications devices associated with the plurality of current users and/or multi-user multimedia devices may be stored in the results database 236, along with a list of incoming calls to the devices associated with the advertiser for the predetermined time period after the advertising content was broadcast. The monitoring server 235 may perform a "join" between the two lists (i.e., to match calls from one list to the other) to thereby determine communications that were likely made responsive to broadcasting the advertising content. The monitoring server 235 may also be configured to indicate the total number of communications made responsive to broadcasting the advertising content to the advertiser. In addition, the monitoring server 235 may be configured to associate a counter with a respective multi-user multimedia device and/or a current user thereof. The counter be incremented responsive to monitoring communications from devices associated with the multimedia device and/or the current user to the advertiser, in order to determine purchasing tendencies for the current user, which may also be provided to the advertiser.

Although FIG. 2 illustrates an exemplary media service provider system according to some embodiments of the present invention, it will be understood that the present invention is not limited to such a configuration but is intended to encompass any configuration capable of carrying out the operations described herein. For example, although illustrated as included in a single system, the functionality of one or more of the multimedia application/content server 228, the advertising server 231, the monitoring server 235, and/or the databases 232, 229, and 236, may be provided as separate components, and/or may be coupled to the media service provider 230 via a local and/or wide area network connection. More generally, while particular functionalities are shown in particular blocks by way of illustrating, functionalities of different blocks and/or portions thereof may be combined, divided, and/or eliminated.

Figure 3:
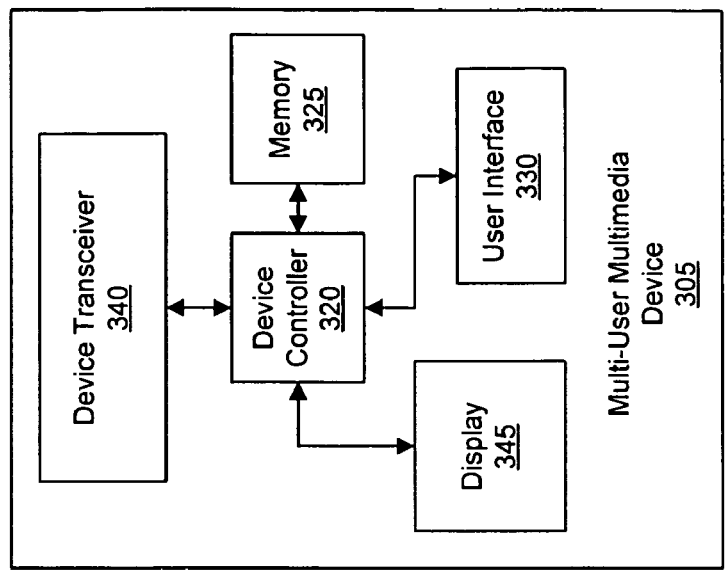
FIG. 3 is a block diagram of a multi-user multimedia device configured to obtain consumer information according to some embodiments of the present invention.

FIG. 3 is a block diagram illustrating a multi-user multimedia device 305 that is configured to obtain consumer information according to some embodiments of the present invention. The multi-user multimedia device 305 may correspond to one or more of the multi-user multimedia devices 105 of the system of FIG. 1. Referring now to FIG. 3, the multi-user multimedia device 305 includes a device controller 320, a user interface 330, a device transceiver 340, a display 345, and a memory 325. The memory 325 may represent a hierarchy of memory that may include volatile and/or volatile memory, such as removable flash, magnetic, and/or optical rewritable non-volatile memory, which may be configured to locally stored user information and/or preferences. The transceiver 340 typically includes a transmitter circuit and a receiver circuit that cooperate to transmit user information to a media service provider, such as the media service provider 130 of FIG. 1, and receive multimedia content and/or applications therefrom. The device controller 320 may be, for example, a commercially available or custom microprocessor that is configured to coordinate and manage operations of the device transceiver 340, the memory 325, the user interface 330, and/or the display 345.

More particularly, the multi-user multimedia device 305 may be configured to receive default media services from the media service provider via the device transceiver 340, responsive to providing device identification and/or authentication information to the media service provider. The multi-user multimedia device 305 may be configured to receive the default media services independent of a particular one of a group of users that is currently using the multi-user multimedia device 305. For example, the default media services may be received based on the bandwidth constraints of the multi-user multimedia device 305 and/or based on current authorization/permission information associated with the multi-user multimedia device 305.

In addition, the multi-user multimedia device 305 may be configured to receive additional media services from the media service provider (via the device transceiver 340) responsive to obtaining and providing confirmation that a particular one of a group of users of the multi-user multimedia device 305 is currently using the multi-user multimedia device 305. More particularly, the multi-user multimedia device 305 may be configured to display a prompt for identification information for the particular one of the group of users that is currently using the multi-user multimedia device 305 via the user interface 330 and/or the display 345. The user identification information may be received via the user interface 330 responsive to displaying the prompt. The multi-user multimedia device 305 may be configured to display the prompt for the identification information responsive to receiving a request for the additional media services via the user interface 330. The multi-user multimedia device 305 may be configured to transmit the received user identification information to the media service provider over the network to identify the current user of the multi-user multimedia device 305.

Alternatively and/or additionally, the multi-user multimedia device 305 may itself be configured to identify the current user, based on the received identification information and based on user information for the group of users locally stored in the memory 325. As such, the multi-user multimedia device 305 may also be configured to provide demographic information for the particular one of the group of users that is currently using the multi-user multimedia device to the media service provider via the transceiver 340. The multi-user multimedia device 305 may further be configured to receive advertising content (which may be targeted based on the demographic information) over the communications network via the device transceiver 340. The received advertising content may be displayed for viewing by the current user via the display 345.

Although FIG. 3 illustrates an exemplary media provider system according to some embodiments of the present invention, it will be understood that the present invention does is not limited to such configurations but is intended to encompass any configuration capable of carrying out the operations described herein. For example, as described above, identification of a current user and/or determination of demographic information for the current user may be performed locally at the multi-user multimedia device 305, and/or may be performed at the media service provider system, as described above with reference to FIG. 2. More generally, while particular functionalities are shown in particular blocks by way of illustrating, functionalities of different blocks and/or portions thereof may be combined, divided, and/or eliminated.

Figures 4A, 4B:
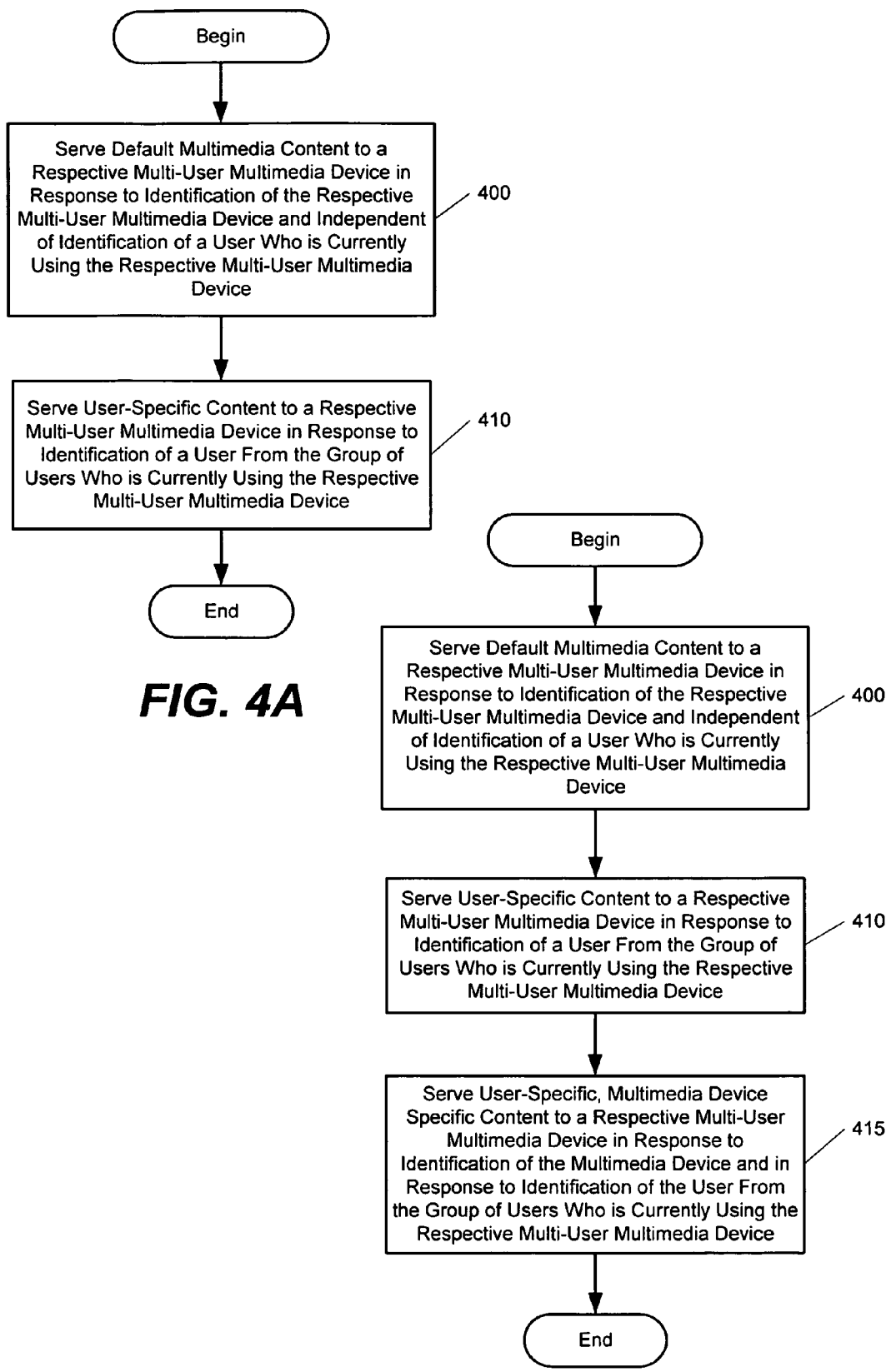
FIGS. 4A and 4B are flow charts illustrating exemplary operations for serving media content to a plurality of multi-user multimedia devices that are shared by a group of users over a communications network according to some embodiments of the present invention.

FIG. 4A is a flowchart illustrating exemplary operations for serving multimedia content over a communications network to a plurality of multi-user multimedia devices that are shared by a group of users according to some embodiments of the present invention. These operations may be performed, for example, by the systems of FIGS. 1 to 3. Referring now to FIG. 4A, default multimedia content is served to a respective multi-user multimedia device in response to identification of the respective multi-user multimedia device at block 400. The default multimedia content may be served to the respective device independent of identification of a user who is currently using the multi-user multimedia device. The default multimedia content may be different content, for example, depending on the device identification and/or authorization. For instance, where the multimedia content is television content, the default content for one multi-user multimedia device may be "basic" television service (for example, 70 different television channels), while the default content for another multi-user multimedia device may be "premium" television service (for example, 200+ channels, including movie channels). In addition, the default content may differ based on the connection and/or capabilities of the particular multi-user multimedia device, for example, based on the bandwidth available to the device.

Still referring to FIG. 4A, in addition to the default multimedia content, user-specific content may be served to a respective multi-user multimedia device at block 410, in response to identification of a user who is currently using the respective multi-user multimedia device from the group of users that share the device. The user-specific content may include personalized content (for example, a "favorites" list of currently available broadcast and/or recorded programming) and/or additional media services (such as electronic programming guides and/or "adult-only" programming). As such, a current user of a multi-user multimedia device may be encouraged to provide user identification information over the communications network in exchange for access to the additional content and/or services. Once the user has been identified, the user-specific content may also include targeted advertisements, for example, based on particular demographic information for the identified user.

FIG. 4B is a flowchart illustrating further exemplary operations for serving multimedia content over a communications network to a plurality of multi-user multimedia devices that are shared by a group of users. As illustrated in FIG. 4B at block 415, in response to identification of a respective multi-user multimedia device (at block 400), and in response to identification of the user (from the group of users) who is currently using the multi-user multimedia device (at block 410), user-specific, multimedia device-specific content is served to the multi-user multimedia device. The user-specific, device-specific content may be additional media services that are personalized to both the specific user and the specific device. In addition, the user-specific, device-specific content may be advertising content targeted to both the specific user (for example, based on user demographic information) as well as to the specific device (for example, based on the location of the device in a household). For instance, in response to identification of a male user age 35-40 currently watching channel 23 on a television in his kitchen at 8:30 am, a commercial for breakfast food may be served to the kitchen television on channel 23. In addition, in response to identification of a predetermined number of current users and devices that match desired demographic and device information, the advertising content may be broadcast to the plurality of multi-user multimedia devices.

Figure 5A:
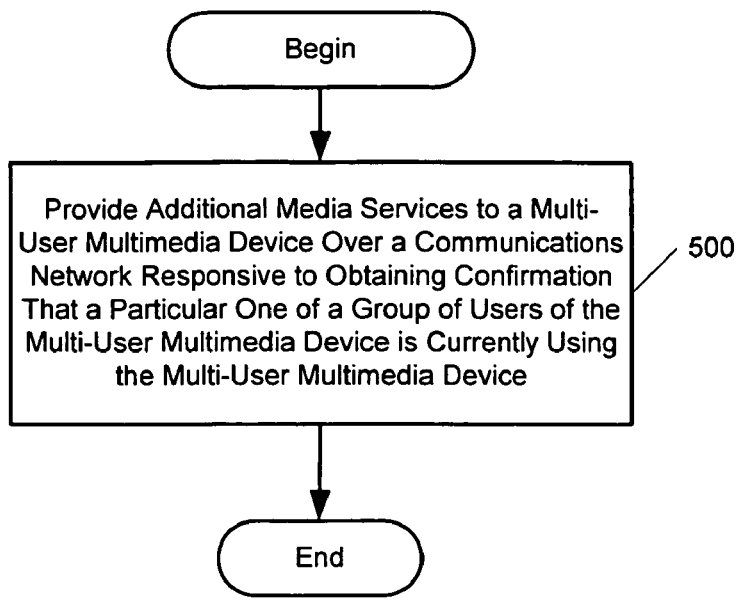
FIGS. 5A and 5B are flow charts illustrating operations for obtaining consumer information over a communications network according to some embodiments of the present invention.

FIG. 5A is a flowchart illustrating exemplary operations for obtaining consumer information over a communications network according to some embodiments of the present invention. The operations of FIG. 5A may be performed by a media services provider, such as the media service provider 130 of FIG. 1. As illustrated in FIG. 5A at block 500, additional media services are provided to a multi-user multimedia device over a communications network responsive to obtaining confirmation that a particular one of a group of users of the multi-user multimedia device is currently using the multi-user multimedia device. The additional media services may include, for example, a "favorites" list of currently available broadcast and/or recorded programming, electronic programming guides, and/or "adult-only" content that would otherwise be inaccessible to the multi-user multimedia device. As such, a current user of the multi-user multimedia device may be offered access to the additional content and/or services as an incentive to "login" to the device with a username, PIN, and/or password, so that consumer information about the current user may be obtained over the network.

Figure 5B:
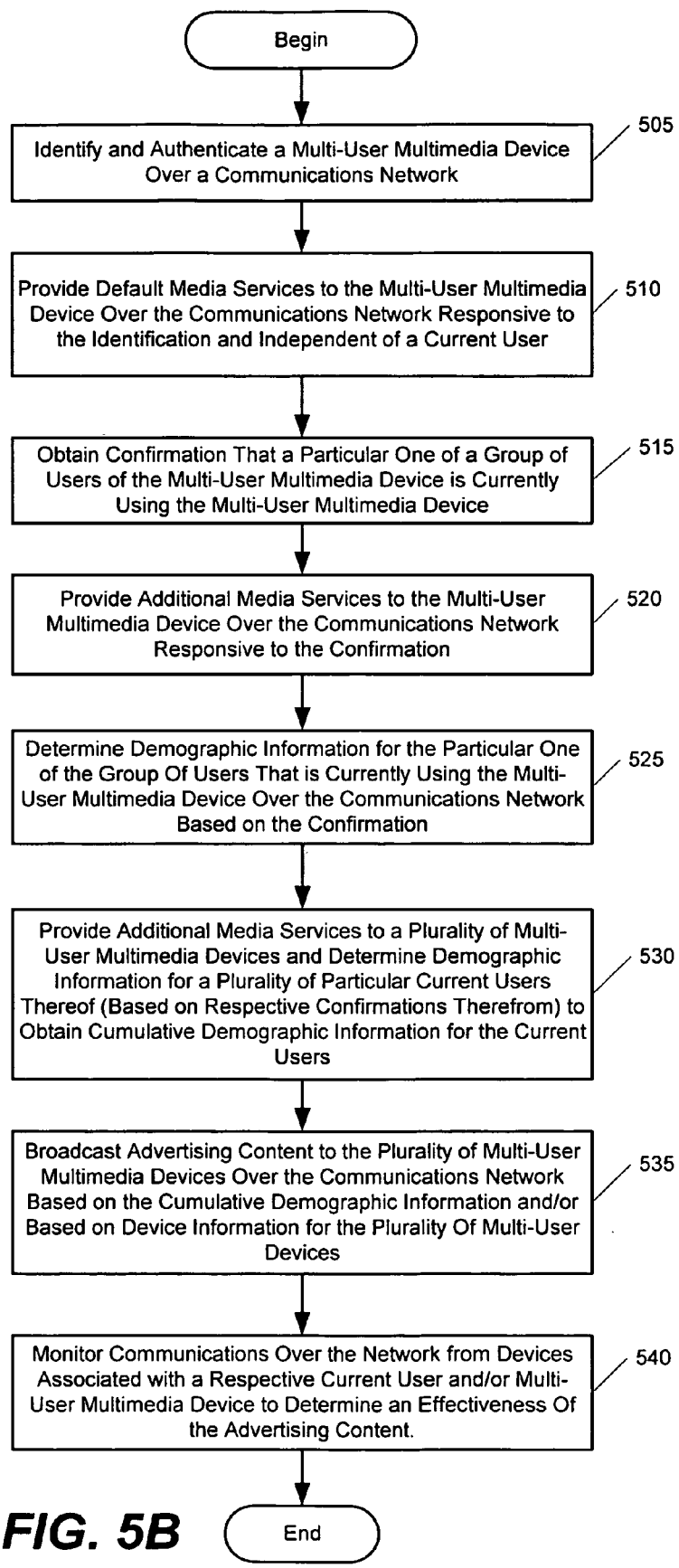

FIG. 5B is a flowchart illustrating detailed operations for obtaining consumer information over a communications network according to some embodiments of the present invention. The operations of FIG. 5B may also be performed by a media services provider, such as the media service provider system 230 of FIG. 2. Referring now to FIG. 5B, operations begin at block 505 when a multi-user multimedia device (i.e., a device that is shared by a group of users) is identified and authenticated over a communications network. For example, the multi-user multimedia device may be an Internet Protocol Television (IPTV) that is configured to receive audio and/or video content from a media service provider over a packet-switched network. Identification and/or authentication of the multi-user multimedia device may be performed immediately upon device startup, and may be performed by conventional methods that are well-known in the art. Responsive to the identification and/or authentication, default media services are provided to the multi-user multimedia device over the communications network at block 510. For example, the IPTV described above may be identified as associated with an account for "premium" television services, and as such, the premium television service may be provided as the default media services for the identified device.

In addition, at block 515, confirmation is obtained that a particular one of a group of users of the multi-user multimedia device is currently using the multi-user multimedia device. For example, the confirmation of the particular user may be obtained by requesting identification information for the particular one of the group of users via a user interface of the multi-user multimedia device in exchange for additional media services, as discussed above. User identification information may be received over the communications network responsive to the requesting, and the particular one of the group of users may be identified based on the received user identification information. For example, a username and/or password for the particular user may be received at a media service provider in response to the request, and the identity of the user may be determined by consulting a customer information storage (CIS) database based on the received username and/or password. Additional media services may be provided to the multi-user multimedia device over the communications network responsive to confirmation of the particular one of the group of users that is currently using the device at block 520. The additional media services may include personalized services, such as user-specific programming guides, and/or additional content, such as "adult" content, as described above.

Also, based on the confirmation that the particular user is currently using the multimedia device, demographic information for the particular user may be determined at block 525. For example, the CIS database may include demographic information for users of a plurality of multi-user multimedia devices, such as age, sex, race, marital status, and/or income level, and demographic information for an identified current user of a respective multimedia device may be determined by consulting the CIS database. As such, cumulative demographic information may be obtained by providing additional media services to a plurality of multi-user multimedia devices (based on respectively obtaining confirmation that a plurality particular users thereof are currently using the multi-user multimedia devices), and determining demographic information for the plurality of particular current users at block 530. This cumulative demographic information for the current users may be provided to interested parties, such as advertisers, over the network in real-time. Cumulative information for the plurality of multi-user multimedia devices currently in use, such as the current channel, bandwidth constraints, and/or location in a household, may also be provided to interested parties in real time over the network.

Accordingly, an advertiser may be provided with specific information as to the size, make-up, and/or device capabilities of a current audience, and may thereby provide targeted advertising to the current audience. As such, advertising content may be broadcast to the plurality of multi-user multimedia devices over the communications network at block 535. The advertising content may be broadcast based on the cumulative demographic information for the plurality of current users and/or based on device information for the plurality of multi-user devices corresponding to the plurality of current users. For example, advertising content may be received from an advertiser along with desired network conditions for broadcasting the advertisement, and the advertising content may be broadcast when the desired network conditions are satisfied based on the cumulative demographic information and/or the device information for the plurality of multi-user multimedia devices currently in use.

More specifically, targeted advertising may be provided based on the demographic information for the plurality of current users, the device information for the plurality of multi-user multimedia devices currently in use, and/or combinations of these factors. For example, an advertiser may specify that a cereal commercial be broadcast when 3000 televisions identified as located in a kitchen are in-use at 8:30 am. In addition, the advertiser may provide a dentures commercial to be broadcast when 7000 adults ages 65-80 are identified as currently using respective radios. Likewise, when 6500 men ages 35-50 are identified as currently using respective televisions located in a bedroom, a commercial for an insomnia drug may be broadcast. Accordingly, device-specific content, user-specific content, and/or user-specific, device-specific content may be provided over the network.

After broadcasting the advertising content, communications over the network from devices associated with a respective current user and/or multi-user multimedia device may be monitored to determine the effectiveness of the advertising content at block 540. For example, outgoing communications from a telephone, cell phone, or internet connection associated with an identified user (or in the same household as an identified multi-user multimedia device) may be monitored for a predetermined time after broadcasting the advertising content (for example, 60 minutes) to determine communications that may have been made responsive to broadcasting the advertising content. More specifically, a list of outgoing communications from such associated devices may be compared to a list of incoming communications to network devices associated with an advertiser (such as telephones at the advertiser's multiple business locations), and a "join" may be performed between the two lists to determine how many communications were made to the advertiser from those users and/or devices that were confirmed as being in-use when the advertising content was broadcast. Accordingly, a total number of communications made responsive to the broadcast of an advertisement may be provided to the advertiser.

Figure 6A:
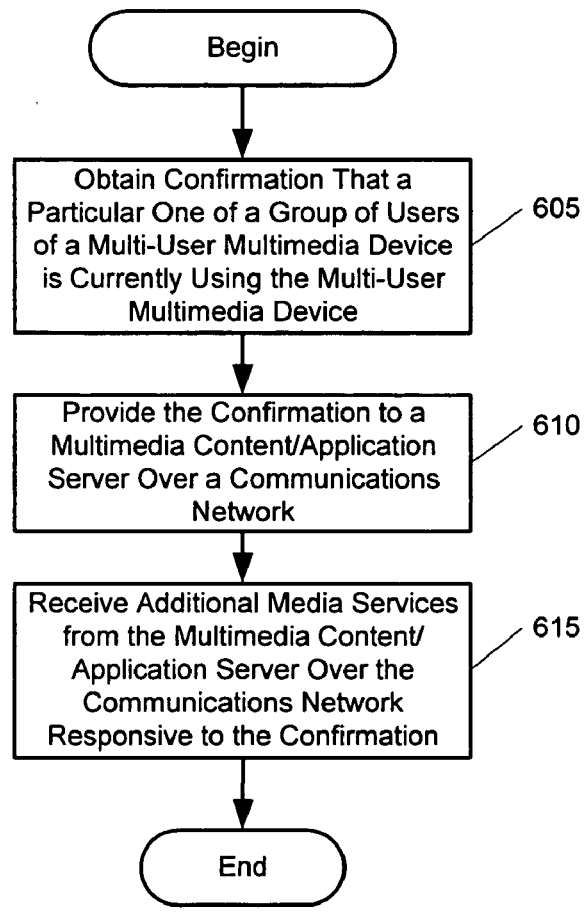
FIGS. 6A and 6B are flow charts illustrating exemplary operations for obtaining consumer information according to further embodiments of the present invention.

FIG. 6A is a flowchart illustrating exemplary operations for obtaining consumer information at a multi-user multimedia device according to some embodiments of the present invention. The operations of FIG. 6A may be performed, for example, by the multi-user multimedia device 305 of FIG. 3. Referring now to FIG. 6A, confirmation that a particular one of a group of users of the multi-user multimedia device is currently using the multi-user multimedia device is obtained at block 605. As discussed above, the confirmation may be obtained by displaying a prompt for identification information for the particular one of the group of users currently using the multi-user multimedia device via a user interface, and receiving user identification information via the user interface responsive to displaying the prompt. The confirmation is provided to a multimedia content server over a communications network at block 610. Responsive to the confirmation, additional media services are received from the multimedia content server over the communications network at block 615. Accordingly, a current user of the multi-user multimedia device may be encouraged to "login" to the device, so that consumer information may be obtained.

Figure 6B:
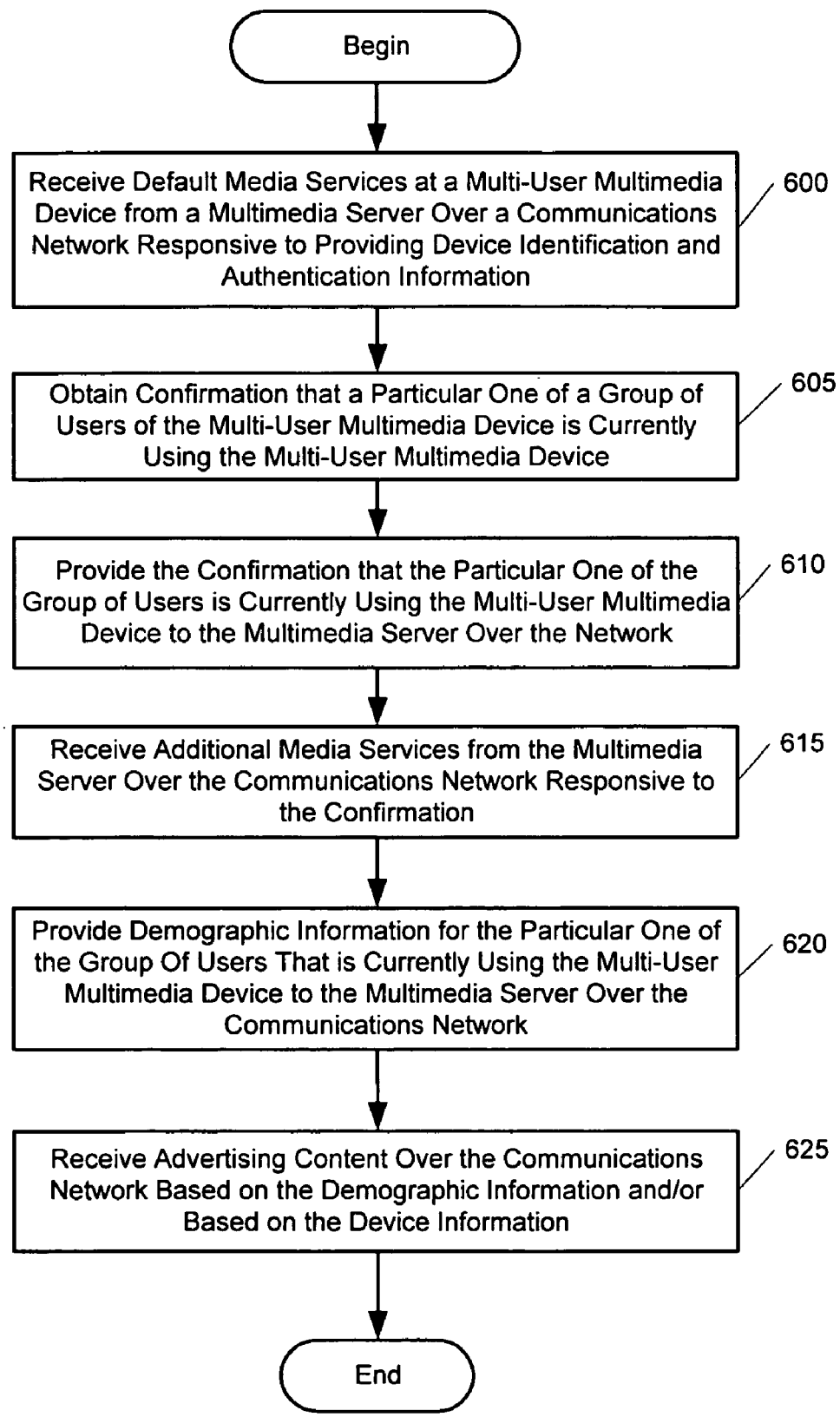

FIG. 6B is a flowchart illustrating detailed operations for obtaining consumer information at a multi-user multimedia device according to some embodiments of the present invention. The operations of FIG. 6B may also be performed by the multi-user multimedia device 305 of FIG. 3. As shown in FIG. 6B, default media services are received from a media service provider over the communications network at block 600, responsive to providing device identification and/or authentication information. The default media services may include basic television service (including differing levels thereof) based on the device identification, and may be independent of a particular one of a group of users that is currently using the multi-user multimedia device. Also, additional media services are received from the media service provider over the network at block 615, responsive to obtaining confirmation that a particular one of the group of users is currently using the multi-user multimedia device (block 605) and providing the confirmation to the media service provider over the communications network (block 610).

Based on the confirmation that the particular one of the group of users is currently using the multi-user multimedia device, demographic information for the particular current user is provided over the network at block 620. For example, the multi-user multimedia device may determine the demographic information for the particular current user based on locally stored demographic information for the group of users. In other embodiments, the demographic information may be determined at the service provider, based on the confirmation provided by the multi-user multimedia device at block 610. Advertising content is received over the communications network based on the demographic information and/or based on the device information at block 625. For example, the advertising content may be provided directly by an advertiser with access to the communications network and the demographic and/or device information, or the advertising content may be provided by the service provider when particular network conditions (specified by the advertiser) are satisfied. The advertising content may be targeted based on identification of the particular user and/or based on identification of the particular multi-user multimedia device, as discussed above.

The flowcharts of FIGS. 4A to 6B illustrate the architecture, functionality, and operations of embodiments of the communication system 100, the media service provider system 230, and/or the multi-user multimedia device 305 hardware and/or software. In this regard, each block may represent a module, a segment, or a portion of code, which may comprise one or more executable instructions for implementing the specified logical functions. It should also be noted that in other implementations, the functions noted in the blocks may occur out of the order noted in FIGS. 4A to 6B. For example, two blocks shown in succession may, in fact, be executed substantially concurrently, or the blocks may sometimes be executed in the reverse order, depending on the functionality involved.

Figure 7:
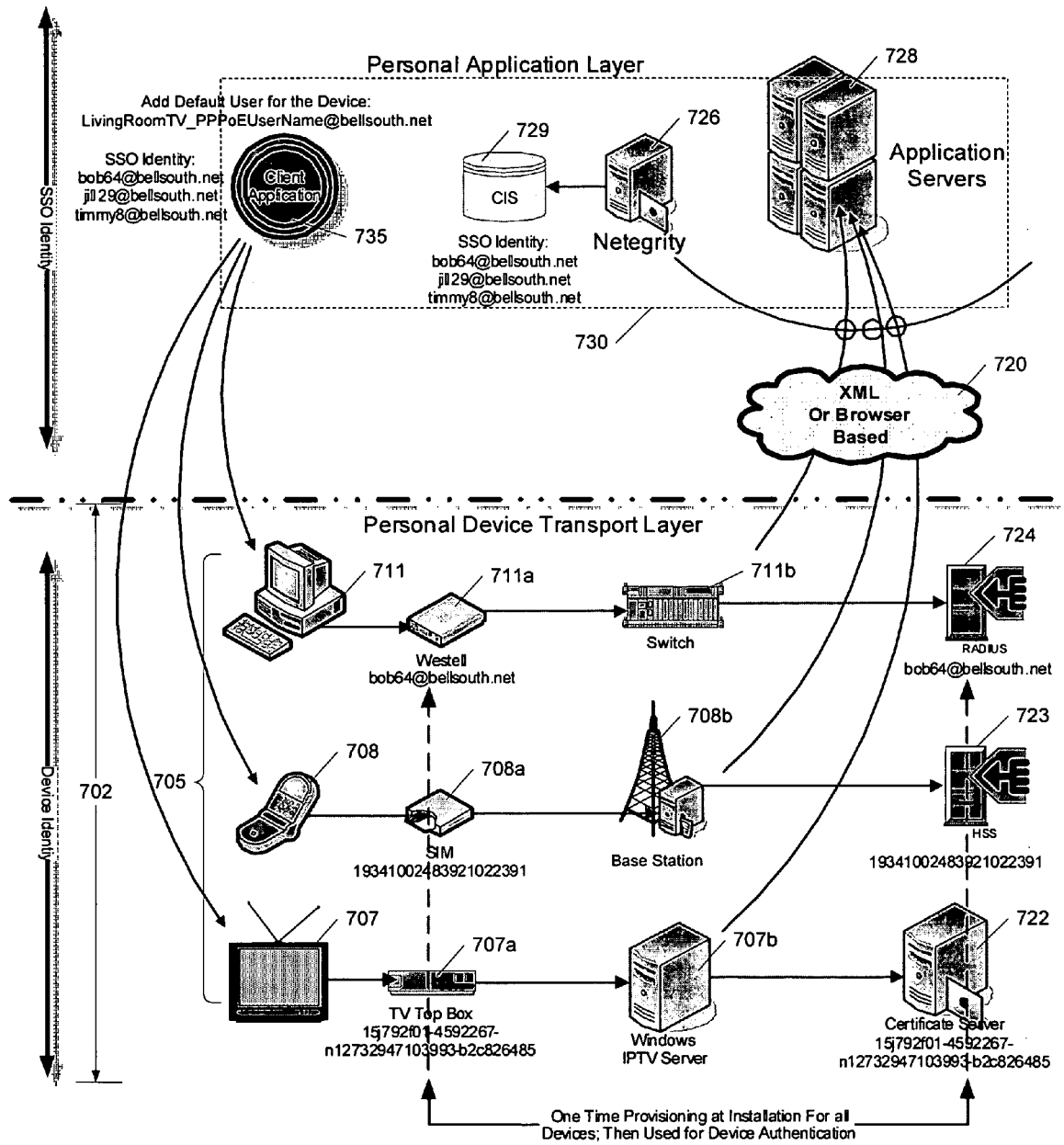
FIGS. 7 and 8 are block diagrams illustrating systems for obtaining consumer information and providing targeted advertising based on the obtained consumer information according to some embodiments of the present invention.

Additional embodiments of the present invention illustrating operations for obtaining consumer information over a communications network will now be described with reference to FIGS. 7 and 8. Referring now to FIG. 7, a Personal Device Transport layer 702 may be created. One or more multi-user multimedia devices 705 (including a personal computer 711, a cell phone 708, and a television 707) may be physically connected to a service provider 730 via a network 720 in order to allow communication therebetween. More particularly, the personal computer 711, cell phone 708, and television 707 may be respectively connected to the network 720 via a modem 711a/switch 711b, a base station 708b, and a set-top box 707a/IPTV server 707b, for example, via a web service or browser-based communication.

Each of the multi-user multimedia devices 705 may have some sort of credentials (for example, a username and/or password) that may be used at the physical connection layer to authenticate that the device is trusted by the network 720. More specifically, the modem 711a, SIM card 708a, and set-top box 707a may be respectively used in authentication of the personal computer 711, the cell phone 708, and the television 707 by one or more servers 722 and/or databases 723 and 724. The credentials may be provisioned at installation, or before the devices 705 are shipped to customers. The credential values generally may not change (with the exception of a strong suggestion to change the password upon receipt in some cases). Once one of the devices 705 is connected to the network 720, applications 735 may be run on that device, and services may be made available via the connection. The applications may have separate credentials that are unique to the particular user, and may utilize an authentication/authorization scheme separate from the device layer credentials of the device, which may be managed by a server 726. The credentials that are entered by the user may have a matching set of values in the Customer Identity Store (CIS) 729 for application authentication purposes.

In some cases, the initial value of a user's credentials may be arbitrarily set to the same value of the device credentials. However, this may be simply because the media service provider 730 has chosen to provision the device in this manner. For example, the modem 711a username and the e-mail username (for the first household admin user) may initially be assigned to the same value (here, bob64@bellsouth.net), although one represents the household and the other represents an individual user within that household. Therefore, these may be treated differently post-installation.

In other cases, the device username may be unique and personal to an individual user, such as for the cell phone 708, and may therefore be used as a non-deplume for the user. In order for this to occur, a relationship between the device username and the user's username may be established in the CIS 729. Applications 735 can thereby discover who the user is from the device username value. However, it may be preferable to encourage the user to log in to all applications (regardless of device) to ensure accuracy. Also, every user of a group of users associated with a particular multi-user multimedia device may be assigned a "role" within the household. For example, for four users associated with a particular device in a given household, the assigned user roles may be Administrator, Adult, Teen, and Child.

Still referring to FIG. 7, in the case of IPTV, a new username and/or role in the household may be created for the device itself. More particularly, the set-top box 707a may be assigned a default username and password with which to log on to the network 720. For example, when the customer receives the device 707a and plugs it in, a prompt may be displayed requesting the customer to name the device 707a, for example, from a drop-down list of suggestions (such as LivingRoomTV, BedroomTV 1, BedroomTV 2, KitchenTV, etc.). There may also be a choice for "Other", and a method to name the device 707a something else unique to that household. The device username may be a combination of the chosen name (from the list of suggestions), the customer's Point to Point Protocol (PPP) username, and/or the media service provider domain name.

For example, as illustrated in FIG. 7, the role for the set-top box 707a may be "Device—TV". Once turned on, the set-top box 707a logs on to all pertinent application software using the default username. The applications will present all the information appropriate for that role's level. For instance, default media services, such as Electronic Programming Guides (EPGs), eSupport, and/or other multimedia content may be provided to the set-top box 707a from the media service provider 730 based on the device's username. However, should a user in the household attempt to access a product or service beyond the device's current authorization (for example, based on the device role level), then the user may be prompted to enter a PIN. The PIN may be used to identify the particular user out of the group of users associated with the set-top box 707a. As such, the set-top box 707a may be logged out, and the current user may be logged on in its place. A generous amount of additional media services (for example, personal EPGs, wallet/account information, additional and/or "adult" media content) may be offered in order to encourage individual log-ins.

Figure 8:
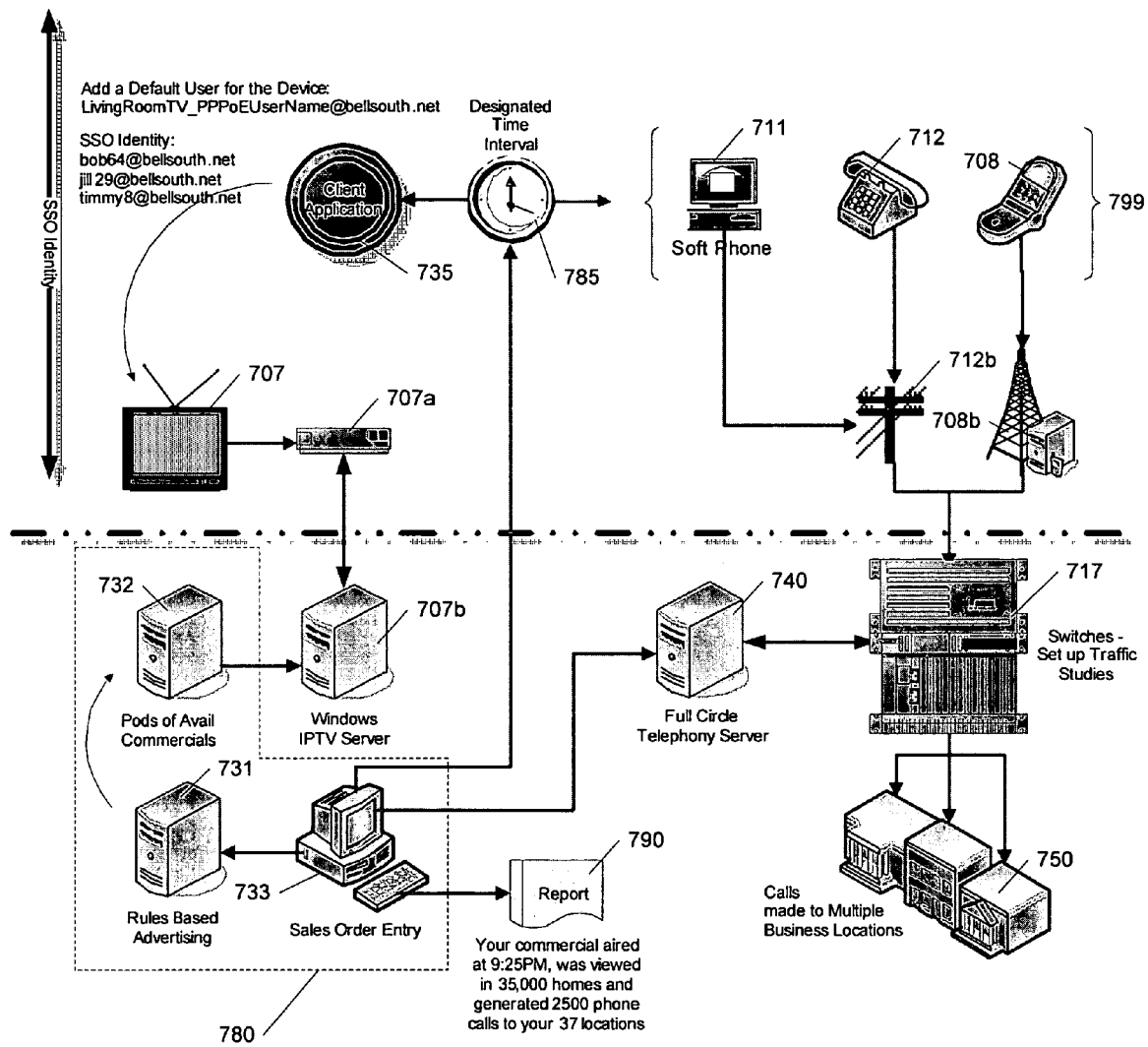

Referring now to FIG. 8, once a particular user logs-in and is identified, commercial content may be targeted based on a particular demographic or even a particular room in a household. In addition, targeted content may be set up based on combinations of user information and device information. For example, a different commercial may be served to a child in a living room than to an administrator (who has buying power) in a bedroom. Also, a service 780 (including an advertising server 731, available commercial content 732, and a sales order interface 733) may be provided, which can allow an advertiser's sales agent to enter a specific type of user, room in the house, and/or total number of current viewers as a "rule" (i.e., desired conditions) for broadcast of an advertisement. Then, when the current network conditions satisfy the desired profile, the commercial may be broadcast responsive to detection of these conditions in real-time.

Accordingly, such a system may reduce and/or eliminate the guess-work that may be associated with advertising. More particularly, according to some embodiments of the present invention, a business/corporation 750 may state the size and make-up of a desired target audience ahead of time. A sales representative for the media service provider 730 could take the order over the phone, or even allow the business/corporation 750 to setup their own desired conditions via a special network application, such as the sales order entry service 780. Once the order is placed, it remains in a queue until the right conditions exist. The commercial is then broadcast, and a report 790 is generated to show the customer details of when they hit their desired market.

In addition, once a certain audience is established (which may be stored in a List A as households), the commercial may be broadcast, and a timer 785 may be started with a variable duration. The network may then be monitored for communications from the established audience by a monitoring server 740. The media service provider 730 may specify that, the longer the duration, the higher the cost of the monitoring to the client. More particularly, a watch is set up for communications from all communication devices 799 associated with those households, including the personal computer 711, the cell phone 708, and a telephone 712, (stored in a List B) to all the phone numbers owned by the business/corporation 750 (stored in a List C). The size of List C may also impact the cost of the monitoring. As calls are made from List B to the client List C, a counter may be set up to capture a "join" between the lists. This information could also be ascertained after the fact, by mining call detail records over the desired time period 785 after the commercial was shown. As such, a solid call-generation number resulting from the broadcast of a particular commercial may be provided to the business/corporation 750, reducing and/or eliminating the "guess-work" typically associated with advertising. In addition, household accounts may be flagged with incremental counters which may be set up to demonstrate purchasing tendencies for the household. The purchasing tendencies may be provided to the business/corporation 750 as demographic information only, to comply with privacy laws. Accordingly, regular or repeat buyers may be a new target demographic that may be provided to an business/corporation 750 by the media service provider 730.

Thus, by providing additional media services in exchange for confirmation that a particular one of a group of users of a multi-user multimedia is currently using the multimedia device, consumer information may be gathered and/or provided to interested parties in real-time. As such, advertising may be targeted to consumers more effectively.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A method for obtaining consumer information, the method comprising:
    authenticating a multimedia device;
    receiving device identification information that uniquely identifies the multimedia device;
    providing default media services comprising audio and video content to the multimedia device over a communications network based on a bandwidth of a connection to the multimedia device, the device identification information independent of a current user that is currently using the multimedia device;
    displaying a prompt to input information that uniquely identifies the current user from multiple users of the multimedia device;
    receiving a personal identification number that uniquely identifies the current user from the multiple users of the multimedia device;
    querying a database storing customer information for the multiple users of the multimedia device;
    receiving a confirmation that the personal identification number is associated with the multimedia device;
    retrieving a favorites list of programming associated with the personal identification number;
    sending the favorites list of programming to the multimedia device;
    retrieving demographic information from the database that is associated with the personal identification number and that does not reveal a name of the current user;
    sending the demographic information to an advertiser;
    comparing the device identification information and the demographic information to rules for broadcasting advertising content of the advertiser;
    determining the device identification information and the demographic information satisfy the rules for broadcasting the advertising content;
    broadcasting the advertising content to the multimedia device to which the default media services were provided over the communications network;
    monitoring outgoing calls from communications devices associated with the current user after the advertising content is broadcast;
    monitoring incoming calls to the advertiser after the advertising content is broadcast; and
    matching telephone numbers of the outgoing calls to the incoming calls to determine calls that were responsive to the advertising content,
    wherein an effectiveness of the advertising content may be determined.

2. The method of claim 1, further comprising receiving a request for the favorites list of programming associated with the personal identification number.

3. The method of claim 1, wherein the rules specify a demographic type matching the demographic information.

4. The method of claim 1, further comprising monitoring the outgoing calls for a predetermined time after the advertising content is broadcast.

5. The method of claim 1, wherein receiving the demographic information comprises receiving a location within the current user's premises.

6. The method of claim 1, further comprising determining a total number of the calls that were responsive to the advertising content.

7. The method of claim 1, further comprising incrementing a counter associated with the current user when an outgoing call matches an incoming call.

8. The method of claim 1, wherein the rules specify household location for the multimedia device.

9. The method of claim 1, further comprising further comprising incrementing a counter associated with a communications device associated with the current user that increments when an outgoing call from the communications device matches an incoming call to the advertiser.

10. The method of claim 1, wherein retrieving the demographic information from the database comprises retrieving the demographic information from local memory in the multimedia device.

11. The method of claim 1, wherein querying the database storing the customer information comprises querying local memory in the multimedia device for the multiple users of the multimedia device.

12. The method of claim 1, wherein receiving the personal identification number comprises receiving the personal identification number from a remote control.

13. The method of claim 1, further comprising retrieving a personal electronic programming guide associated with the personal identification number.

14. A system for obtaining consumer information, the system comprising:
a processor executing instructions stored in memory that cause the processor to:
send device identification information to authenticate a multimedia device;
receive default media services comprising audio and video content at the multimedia device from a communications network based on a bandwidth of a connection to the multimedia device;
display a prompt to input information that uniquely identifies a current user from multiple users of the multimedia device;
receive a personal identification number that uniquely identifies the current user from the multiple users of the multimedia device;
query a database storing customer information for the multiple users of the multimedia device;
receive a confirmation that the personal identification number is associated with the multimedia device;
retrieve a favorites list of programming associated with the personal identification number;
retrieve demographic information from the database that is associated with the personal identification number and that does not reveal a name of the current user;
send the demographic information to an advertiser;
compare the device identification information and the demographic information to rules for broadcasting advertising content of the advertiser;
determine the device identification information and the demographic information satisfy the rules for broadcasting the advertising content;
receive the advertising content at the multimedia device to which the default media services were provided over the communications network;
monitor outgoing calls from communications devices associated with the current user after the advertising content is broadcast;
monitor incoming calls to the advertiser after the advertising content is broadcast; and
match telephone numbers of the outgoing calls to the incoming calls to determine calls that were responsive to the advertising content,
wherein an effectiveness of the advertising content may be determined.

15. The system of claim 14, wherein monitoring the outgoing calls comprises monitoring the outgoing calls for a predetermined time after the advertising content is broadcast.

16. The system of claim 15, wherein monitoring the incoming calls comprises monitoring the incoming calls for a predetermined time after the advertising content is broadcast.

17. The system of claim 14, wherein receiving the demographic information comprises receiving a location of the multimedia device within the current user's premises.

18. A non-transitory computer readable medium storing processor executable instructions for performing a method, the method comprising:
authenticating a multimedia device;
receiving device identification information that uniquely identifies the multimedia device;
providing default media services comprising audio and video content to the multimedia device over a communications network based on a bandwidth of a connection to the multimedia device, the device identification information independent of a current user that is currently using the multimedia device;
displaying a prompt to input information that uniquely identifies the current user from multiple users of the multimedia device;
receiving a personal identification number that uniquely identifies the current user from the multiple users of the multimedia device;
querying a database storing customer information for the multiple users of the multimedia device;
receiving a confirmation that the personal identification number is associated with the multimedia device;
retrieving a favorites list of programming associated with the personal identification number;
sending the favorites list of programming to the multimedia device;
retrieving demographic information from the database that is associated with the personal identification number and that does not reveal a name of the current user;
sending the demographic information to an advertiser;
comparing the device identification information and the demographic information to rules for broadcasting advertising content of the advertiser;
determining the device identification information and the demographic information satisfy the rules for broadcasting the advertising content;
broadcasting the advertising content to the multimedia device to which the default media services were provided over the communications network;
monitoring outgoing calls from communications devices associated with the current user after the advertising content is broadcast;
monitoring incoming calls to the advertiser after the advertising content is broadcast; and
matching telephone numbers of the outgoing calls to the incoming calls to determine calls that were responsive to the advertising content,
wherein an effectiveness of the advertising content may be determined.

19. The computer readable medium of claim 18, further comprising receiving a request for the favorites list of programming associated with the personal identification number.

20. The computer readable medium of claim 18, wherein the rules specify a demographic type matching the demographic information.

21. The computer readable medium of claim 18, further comprising monitoring the outgoing calls for a predetermined time after the advertising content is broadcast.

22. The computer readable medium of claim 18, further comprising monitoring the incoming calls for a predetermined time after the advertising content is broadcast.

23. The computer readable medium of claim 18, further comprising determining a total number of the calls that were responsive to the advertising content.

24. The computer readable medium of claim 23, further comprising incrementing a counter associated with the current user when an outgoing call matches an incoming call.

25. The computer readable medium of claim 18, further comprising incrementing a counter associated with a communications device associated with the current user that increments when an outgoing call from the communications device matches an incoming call to the advertiser.

26. The computer readable medium of claim 18, wherein retrieving the demographic information from the database comprises retrieving the demographic information from local memory in the multimedia device.

27. The computer readable medium of claim 18, wherein querying the database storing the customer information comprises querying local memory in the multimedia device for the multiple users of the multimedia device.

28. The computer readable medium of claim 27, wherein receiving the personal identification number comprises receiving the personal identification number from a remote control.

29. The computer readable medium of claim 27, further comprising retrieving a personal electronic programming guide associated with the personal identification number.

* * * * *